(12) United States Patent
Hyatt (10) Patent No.: US 7,565,179 B2
(45) Date of Patent: Jul. 21, 2009

(54) NO-CABLE STEREO HANDSFREE ACCESSORY

(75) Inventor: Edward Craig Hyatt, Durham, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 409 days.

(21) Appl. No.: 11/379,818

(22) Filed: Apr. 24, 2006

(65) Prior Publication Data

US 2007/0249411 A1   Oct. 25, 2007

(51) Int. Cl.
*H04B 5/10* (2006.01)
*H04M 1/10* (2006.01)

(52) U.S. Cl. ............... 455/569.1; 455/41.1; 455/569.2

(58) Field of Classification Search ... 455/569.1–569.2, 455/41.1
See application file for complete search history.

(56) References Cited

U.S. PATENT DOCUMENTS

| | | | | |
|---|---|---|---|---|
| 4,862,494 | A * | 8/1989 | Matheny | 379/145 |
| 6,223,102 | B1 * | 4/2001 | Busch | 700/279 |
| 6,370,401 | B1 | 4/2002 | Baranowski | |
| 6,374,126 | B1 | 4/2002 | MacDonald et al. | |
| 2001/0034253 | A1 | 10/2001 | Ruschin | |
| 2003/0186708 | A1 * | 10/2003 | Parulski et al. | 455/456.1 |
| 2004/0001588 | A1 * | 1/2004 | Hairston | 379/419 |
| 2004/0219890 | A1 * | 11/2004 | Williams et al. | 455/100 |
| 2004/0243416 | A1 * | 12/2004 | Gardos | 704/275 |
| 2005/0043056 | A1 * | 2/2005 | Boesen | 455/550.1 |
| 2005/0259812 | A1 | 11/2005 | Chen | |
| 2006/0013410 | A1 | 1/2006 | Wurtz | |
| 2006/0030360 | A1 | 2/2006 | Yeh | |
| 2006/0046656 | A1 | 3/2006 | Yang | |
| 2006/0166705 | A1 * | 7/2006 | Seshadri et al. | 455/569.1 |
| 2006/0209013 | A1 * | 9/2006 | Fengels | 345/156 |
| 2006/0224048 | A1 * | 10/2006 | Devaul et al. | 600/300 |
| 2007/0127659 | A1 * | 6/2007 | McClory et al. | 379/161 |
| 2007/0147630 | A1 * | 6/2007 | Chiloyan | 381/74 |

FOREIGN PATENT DOCUMENTS

| | | |
|---|---|---|
| DE | 20 2004 005524 | 7/2004 |
| EP | 1 482 715 | 12/2004 |
| GB | 2376830 | * 12/2002 |
| GB | 2387979 A | * 10/2003 |
| WO | 99/43136 | 8/1999 |
| WO | 2005/109950 | 11/2005 |

OTHER PUBLICATIONS

International Search Report for corresponding Application No. PCT/US2007/000205 dated Jun. 18, 2007.

* cited by examiner

*Primary Examiner*—Nick Corsaro
*Assistant Examiner*—Amanuel Lebassi
(74) *Attorney, Agent, or Firm*—Renner, Otto, Boisselle & Sklar, LLP (57) ABSTRACT

A handsfree accessory for a mobile communication device is provided. The handsfree accessory includes first and second earpieces each having a respective audio transducer, a microphone, and a transceiver. The transceiver is operatively coupled to the respective audio transducers and the microphone, and provides for wireless communication between the handsfree accessory and the mobile communication device.

19 Claims, 6 Drawing Sheets

NO-CABLE STEREO HANDSFREE ACCESSORY

TECHNICAL FIELD OF THE INVENTION

The present invention relates generally to portable electronic devices, and more particularly to a stereo accessory for use with portable electronic devices.

DESCRIPTION OF THE RELATED ART

Portable electronic devices have been popular for decades yet continue to increase in popularity. Many modern portable electronic devices are intended or suitable for recording or playback of acoustic and/or video signals. For example, portable CD or DVD players, MPEG players, MP-3 players, etc. provide a vast variety of forms of personal entertainment. Whether audio and/or video entertainment, there are numerous portable electronic devices to satisfy any user's tastes.

Similarly, portable electronic devices in the form of mobile phones, pagers, communicators, e.g., electronic organizers, personal digital assistants (PDAs), smartphones or the like are also becoming increasingly popular. Such devices allow a user to communicate with others, store and manipulate data, create text, etc., many times within the same device.

Depending on the particular application(s) a given portable electronic device performs, oftentimes one or more accessories are used in combination with the portable electronic device. Examples of such accessories include headsets, portable keyboards, input pens, scanners, etc., which may be coupled to the portable electronic device via an appropriate cord and connector. As a particular example, for many applications it is desirable to have a headset, the headset typically comprising one or more loudspeakers, which may be in the form of one or two earplugs, and/or one or more microphones. By using a headset, a user of a mobile phone can enjoy more privacy when the others around him or her cannot hear the telephone conversation. Further, by using a suitable microphone in the headset, the telephone call can still be successfully arrived at even though there may be much background noise.

In a conventional stereo headset accessory for a mobile phone, stereo earbuds are driven by a small capsule including a microphone and simple controls. The capsule is connected to the mobile phone via a cable. In addition, there have been wireless headset accessories for mobile phones. These wireless headsets typically are in the form of a Bluetooth enabled wireless headset. The headset includes an audio output channel and microphone, and attaches to one ear of a user.

While the above-described handsfree headsets are useful for allowing a user of a mobile phone to communicate with more privacy and convenience, a number of drawbacks still exist. For example, the stereo headset for the mobile phone includes a cabled connection to the mobile phone. The cabled connection can be bothersome in that the cable may inadvertently get in the way of the user, accidentally get snagged on something resulting in the headset being ripped from the ear of the user, etc. The Bluetooth enabled wireless headset, on the other hand, provides a wireless connection to the mobile phone. However, the Bluetooth enabled wireless headset provides only a monaural audio output channel. Thus, the user of the Bluetooth enabled wireless headset loses the benefit and/or enjoyment of multi-channel audio.

In view of the aforementioned disadvantages with existing stereo handsfree accessories, there is a strong need in the art for a wireless handsfree accessory for proving handsfree operation of a mobile phone, for example, without sacrificing stereo or multi-channel audio operation.

SUMMARY

According to an aspect of the invention, a handsfree accessory for a mobile communication device is provided. The handsfree accessory includes first and second earpieces each having a respective audio transducer, a microphone, and a transceiver. The transceiver is operatively coupled to the respective audio transducers and the microphone, and provides for wireless communication between the handsfree accessory and the mobile communication device.

In accordance with a particular aspect, the handsfree accessory further includes an earpiece housing integral with the first earpiece and housing the transceiver.

According to another aspect, the second earpiece is coupled to the housing via a tether.

In accordance with yet another aspect, the tether is retractable.

According to still another aspect, the tether includes an electrically conductive wire which carries audio information between the transceiver and the audio transducer of the second earpiece.

According to yet another aspect, the tether includes a pair of electrically conductive wires which carry the audio information between the transceiver and the audio transducer of the second earpiece.

According to another aspect, the handsfree accessory further includes at least one electrical body contact for establishing a virtual ground via the body of a user with respect to the audio information carried on the electrically conductive wire.

In accordance with still another aspect, the tether includes a light guide which carries audio information between the transceiver and the audio transducer of the second earpiece.

According to still another aspect, the tether includes an optical fiber which carries audio information between the transceiver and the audio transducer of the second earpiece.

With yet another aspect, the handsfree accessory further includes a wireless link for carrying audio information between the transceiver and the audio transducer of the second earpiece.

Yet with another aspect, the wireless link includes a radio frequency (RF) link.

According to another aspect, the RF link includes a near-field RF link.

In accordance with still another aspect, the near-field RF link utilizes body conduction of a user.

According to yet another aspect, the wireless link includes an optical link.

With still another aspect, the wireless link includes an IR link.

According to another aspect of the invention, a handsfree accessory for a device is provided. The handsfree accessory includes first and second earpieces each having a respective audio transducer. In addition, the handsfree accessory includes a receiver, operatively coupled to the respective audio transducers, for providing wireless communication between the handsfree accessory and the device. An earpiece housing integral with the first earpiece and housing the receiver is included, together with a non-two-wire communication link which carries audio information between the receiver and the audio transducer of the second earpiece.

In accordance with another particular aspect, the non-two-wire communication link includes an electrically conductive wire which carries audio information between the transceiver and the audio transducer of the second earpiece, and at least one electrical body contact for establishing a virtual ground via the body of a user with respect to the audio information carried on the electrically conductive wire.

According to another aspect, the non-two-wire communication link includes a light guide which carries audio information between the transceiver and the audio transducer of the second earpiece.

With respect to yet another aspect, the non-two-wire communication link includes an optical fiber which carries audio information between the transceiver and the audio transducer of the second earpiece.

In accordance with still another aspect, the non-two-wire communication link includes a wireless link for carrying audio information between the transceiver and the audio transducer of the second earpiece.

According to yet another aspect, wherein the wireless link comprises a radio frequency (RF) link.

According to still another aspect, the RF link comprises a near-field RF link.

With yet another aspect, the near-field RF link utilizes body conduction of a user.

In accordance with another aspect, the wireless link includes an optical link.

According to another aspect, the wireless link includes an IR link.

In accordance with yet another aspect, the earpiece housing includes an electrical connector for electrically engaging the second earpiece to enable a battery in the second earpiece to be recharged when a battery in the earpiece housing is recharged.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF EMBODIMENTS

The present invention will now be described with reference to the figures, in which like reference labels are used to refer to like elements throughout.

Figure 1:
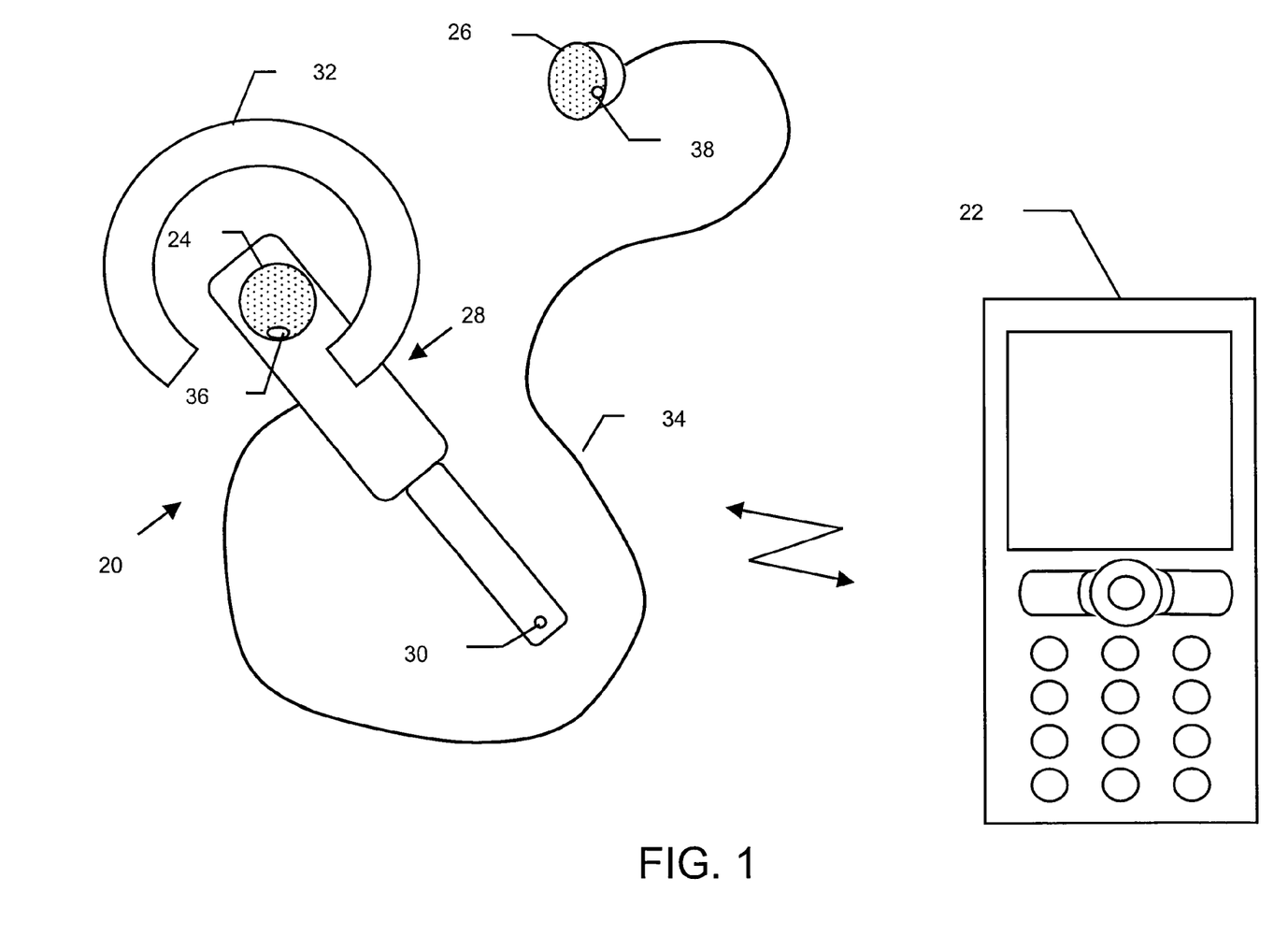
FIG. 1 is an environmental view of a handsfree accessory for use with a mobile communication device in accordance with an embodiment of the present invention.

FIG. 1 illustrates an exemplary embodiment of a handsfree accessory 20 in accordance with the present invention. The handsfree accessory 20 is configured for use with a mobile communication device such as a mobile phone 22. As will be appreciated, the handsfree accessory 20 allows a user of the mobile phone 22 to experience personal hands-free (PHF) communications with someone at the other end of a call. Moreover, the handsfree accessory 20 allows the user to enjoy two-channel audio (e.g., left and right channel stereo audio). The two-channel audio may be as a result of a monaural signal from a telephone call being converted to two-channel audio by the mobile phone 22, for example. Alternatively, the mobile phone 22 may provide the two-channel audio to the handsfree accessory 20 as part of a media player function of the mobile phone 22. For example, the mobile phone 22 may output stereo audio as part of a music player or as part of an audio soundtrack accompanying a video presentation by the mobile phone 22.

The handsfree accessory 20 includes a first earpiece 24 and a second earpiece 26 each having a respective audio transducer (not shown). In the exemplary embodiment, the first earpiece 24 and the second earpiece 26 are in the shape of conventional earbuds that may be inserted into the ears of a user. The first earpiece 24 provides a first channel of audio information (e.g., left channel), and the second earpiece 26 provides a second channel of audio information (e.g., right channel). Those having ordinary skill in the art, however, will appreciate that the first and second channel audio information are interchangeable without departing from the scope of the invention.

The handsfree accessory 20 further includes an earpiece housing 28 that is integral with the first earpiece 24. In the exemplary embodiment, the earpiece housing 28 is a lightweight boom-shaped housing with the first earpiece 24 mounted at one end and a microphone 30 mounted at the other end. The earpiece housing 28 also includes an earclip 32 for attaching the earpiece housing 28 to the ear of a user with the first earpiece 24 inserted in or adjacent to the opening of the user's ear. At the same time, the earpiece housing 28 positions the microphone 30 in the vicinity of the user's mouth. Thus, similar to conventional Bluetooth enabled wireless headsets, a user can talk to and receive communications from a caller via the mobile phone 22 via the earpiece housing 28. In accordance with the present invention, however, the user also is able to receive the second channel of audio information via the second earpiece 26 inserted in or adjacent to the opening of the user's other ear.

As will be explained in more detail below, the earpiece housing 28 includes a transceiver therein. The transceiver is operatively coupled to the respective audio transducers of the first earpiece 24 and the second earpiece 26. In addition, the transceiver is operatively coupled to the microphone 30. The transceiver may be a Bluetooth transceiver or other type of wireless transceiver for providing wireless communications between the handsfree accessory 20 and the mobile phone 22.

FIG. 1 illustrates an embodiment of the handsfree accessory 20 in which the second earpiece 26 is physically coupled to the earpiece housing 28 by way of a tether 34. Depending on the particular embodiment of the handsfree accessory 20 as described more fully below, the tether 34 may be simply a string, plastic cord, elastic band, etc. In such case, the tether 34 simply serves to keep the second earpiece 26 physically connected to the main unit represented by the earpiece housing 28. In addition, or in the alternative, the tether 34 may be made up of a cable that provides not only a physical connection between the second earpiece 26 and the earpiece housing 28, but also provides an electrical and/or optical connection to the second earpiece 26. The electrical and/or optical connection allows second channel audio information from the transceiver in the earpiece housing 28 to be provided to the second earpiece 26.

For example, in one embodiment the tether 34 includes an electrically conductive wire that carries audio information between the transceiver and the audio transducer of the second earpiece 26. In another example, the tether 34 includes a pair of electrically conductive wires that carry the audio information between the transceiver and the audio transducer of the second earpiece 26. In another embodiment, the tether 34 includes a light guide or an optical fiber, either of which may carry audio information between the transceiver and the audio transducer of the second earpiece 26. In still yet another embodiment, the tether 34 may be retractable so as to retract into the earpiece housing 28 and/or into the second earpiece 26.

As will also be described in more detail below, the handsfree accessory 20 may include one or more electrical body contacts for establishing a virtual ground via the body of a user. For example, the first earpiece 24 may include a conductive metal electrode 36 and/or the second earpiece 26 may include a conductive metal electrode 38. When the first earpiece 24 or second earpiece 26 is inserted into a respective ear of the user, the electrode 36 and/or 38 engages in physical contact with the skin of the user. Thus, the electrodes 36 and/or 38 are able to establish electrical contact with the body of the user.

According to another embodiment of the present invention also described in more detail below, the transceiver in the earpiece housing 28 is wirelessly linked to the second earpiece 26. Thus, there is no need for any type of tether 34 physically connecting the second earpiece 26 to the earpiece housing 28 (although such a physical connection may still be desirable in the event one is concerned about the second earpiece 26 inadvertently becoming separated from the main unit earpiece housing 28). The wireless link may be a radio frequency (RF) link such as a near-field RF link, an optical link, an infrared (IR) link, etc. as will be explained further below.

Figure 2:
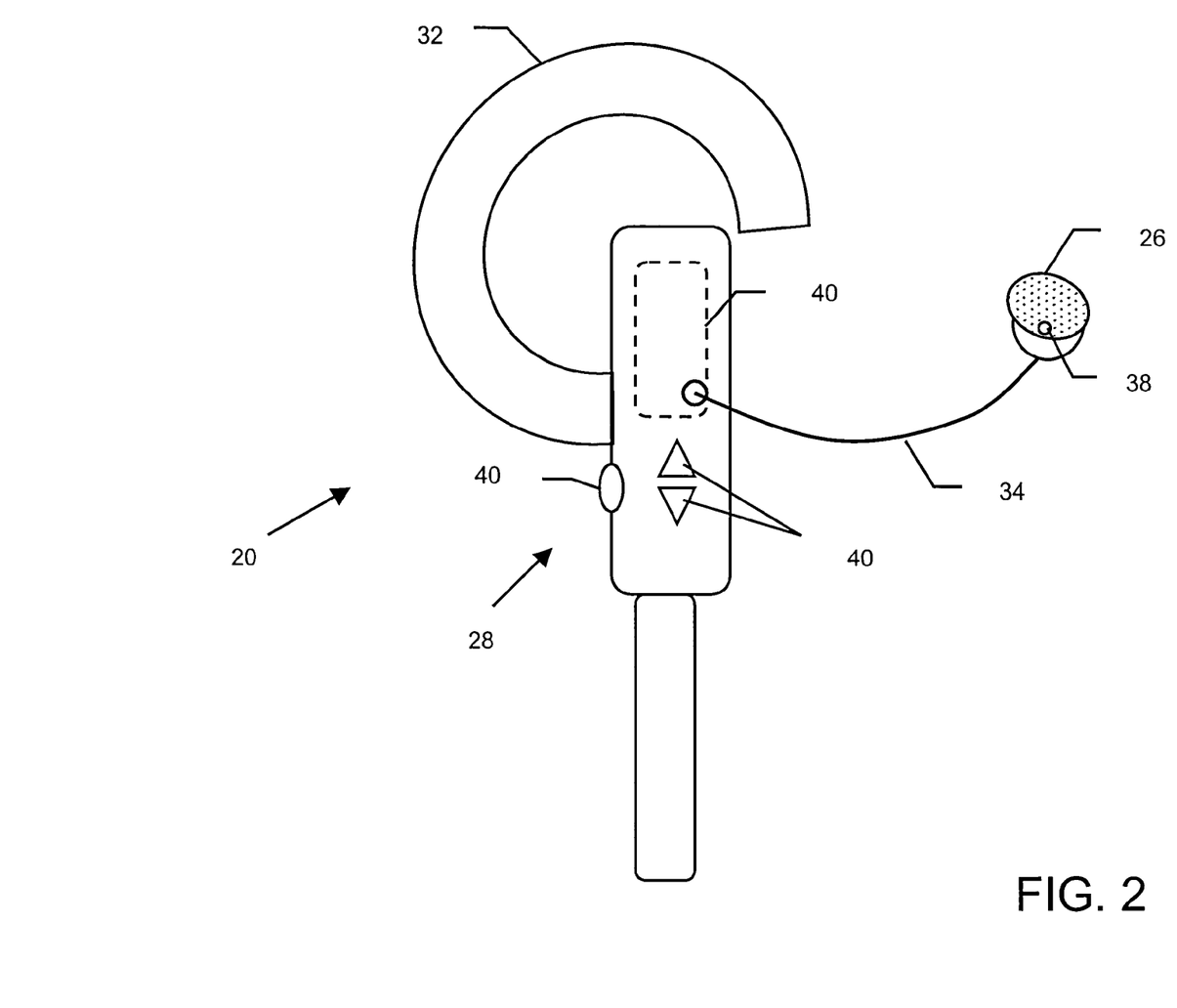
FIG. 2 is an opposite side view of the handsfree accessory of FIG. 1 in accordance with an embodiment of the present invention.

FIG. 2 shows the handsfree accessory 20 from the opposite side of that shown in FIG. 1. As is shown in phantom, the earpiece housing 28 may include a spring loaded retractor spool 40 or the like which allows the tether 34 to be retracted into the earpiece housing 28 when the handsfree accessory 20 is not in use. Alternatively, the retractor spool 40 may be included as part of the second earpiece 26 so as to retract the tether 34 from the opposite end into the second earpiece 26. The handsfree accessory 20 may further include one or more buttons 42 as shown for controlling operation (e.g., picking up a call or ending a call, adjusting the volume, turning on/off, etc.).

Figure 3:
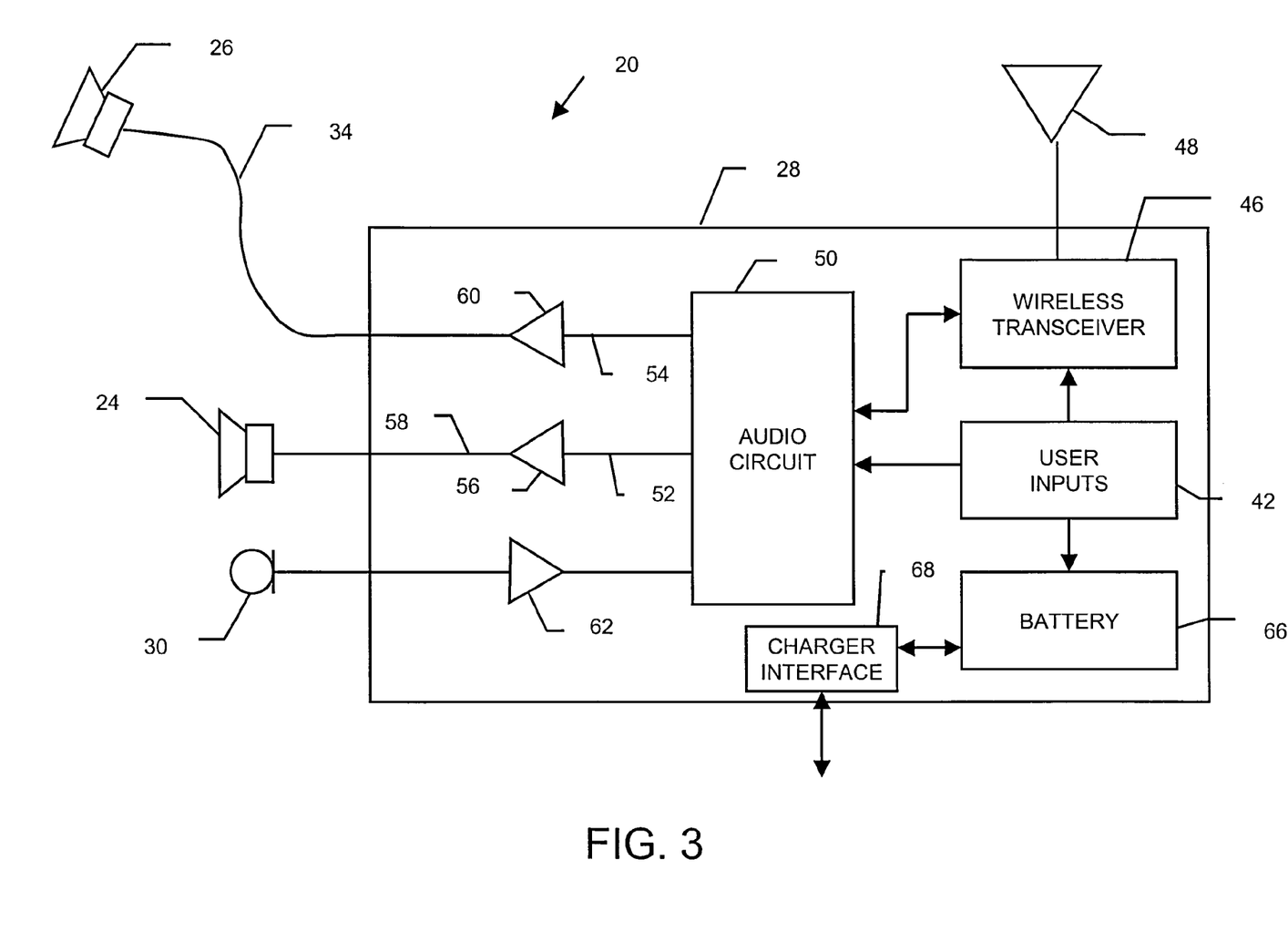
FIG. 3 is a simplified block diagram of a handsfree accessory in accordance with one particular embodiment of the present invention.

Referring now to FIG. 3, a block diagram of the handsfree accessory 20 is shown. The handsfree accessory 20 includes the aforementioned wireless transceiver 46 designed to communicate wirelessly with the mobile phone 22 (FIG. 1). In the exemplary embodiment, the wireless transceiver 46 is a Bluetooth wireless transceiver designed to communicate with the mobile phone 22 according to known Bluetooth protocols. Alternatively, the wireless transceiver 46 may be any other type of RF wireless transceiver or other type of transceiver (e.g., optical, infrared, acoustic, etc). Significantly, however, the handsfree accessory 20 does not require a cabled connection between the handsfree accessory 20 and the mobile phone 22. In the exemplary embodiment, the Bluetooth wireless transceiver 46 includes an antenna 48 for communicating with a corresponding Bluetooth transceiver included in the mobile phone 22.

In accordance with the present invention, the mobile phone 22 transmits a two-channel audio signal to the handsfree accessory 20. The two-channel audio signal may be an actual or synthesized two-channel stereo audio signal based on the audio signal obtained from a person at the other end of a telephone call involving the mobile phone 22. Alternatively, the two-channel audio signal may be a stereo audio signal output by the mobile phone 22 when the mobile phone 22 is operating in a music player mode as is known.

The handsfree accessory 20 receives the two-channel signal from the mobile phone 22 via the antenna 48 and the wireless transceiver 46. The wireless transceiver 46 processes the received RF signal and outputs a two-channel audio signal to an audio circuit 50 included in the handsfree accessory 20. The audio circuit 50 separates the audio signal received from the wireless transceiver 46 into first and second channels of audio information on lines 52 and 54, respectively. The first channel of audio information is amplified via an audio amplifier 56, and is provided to the first earpiece 24 via line 58 so as to reproduce the first channel of audio information into sound that may be heard by the user. Similarly, the second channel of audio information on line 54 is amplified by an audio amplifier 60, and is provided to the second earpiece 26 via the tether 34 so as to reproduce the second channel of audio information into sound that may be heard by the user. In the embodiment of FIG. 3, the tether 34 is a conventional two-wire cable that serves to provide an amplified audio signal to the second earpiece 26. The second earpiece 26 in turn converts the amplified audio signal into sound via an electro-acoustical transducer as is known.

The microphone 30 detects voice signals from the user. An audio amplifier 62 amplifies the voice signals, and the amplified output is input to and processed by the audio circuit 50. The audio circuit 50 provides the processed voice signals to the wireless transceiver 46 that transmits the voice signals to the mobile phone 22 by way of the antenna 48. In this manner, the user can conduct handsfree operation of the mobile phone 22 during a telephone call.

The handsfree accessory 20 also includes the aforementioned user inputs 42 for controlling the handsfree accessory 20 and/or the mobile phone 22 as noted above. In addition, the handsfree accessory 20 includes a battery 66 or other power supply source for providing operating power to the electronic components within the handsfree accessory 20. The battery 66 may be rechargeable via a charger interface 68 also included in the handsfree accessory 20.

Figure 4:
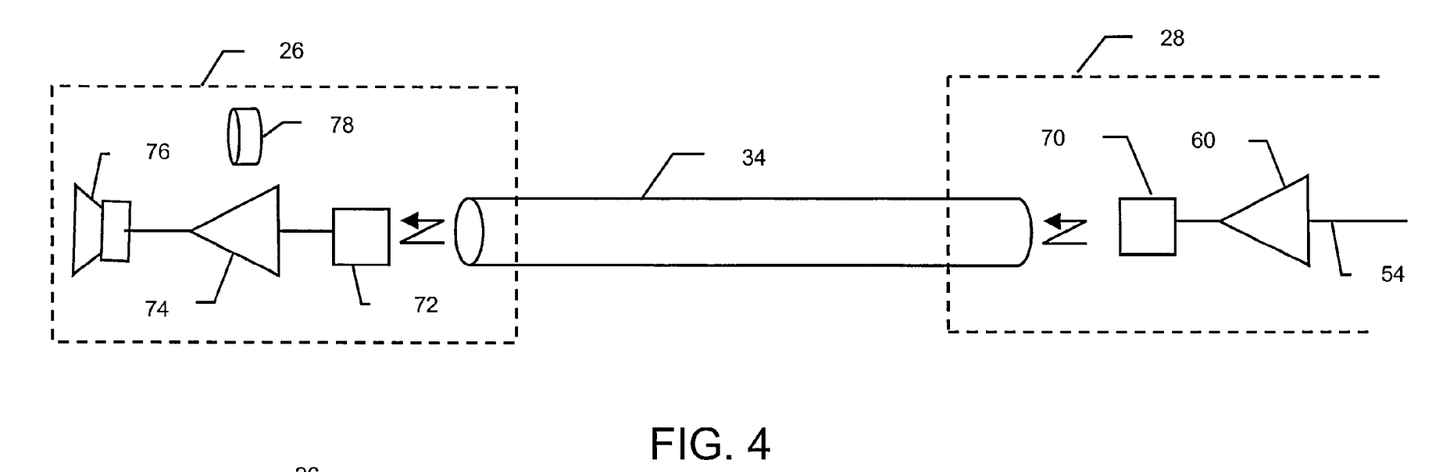
FIG. 4 is a block diagram of a handsfree accessory, shown in relevant part, in accordance with another particular embodiment of the present invention.

As noted above, the tether 34 may be a conventional two-wire cable electrically and mechanically connecting the earpiece housing 28 to the second earpiece 26. However, those having ordinary skill in the art will appreciate that other approaches may be used without departing from the intended scope of the invention. For example, FIG. 4 illustrates in relevant part an embodiment in which the tether 34 is made of a flexible, internally-reflective light pipe. The earpiece housing 28 includes a light emitting device 70 such as a light emitting diode (LED) or other photo-emissive device which outputs light modulated in accordance with the amplified audio signal from the amplifier 60. The modulated light is input at one end of the light pipe 34 and travels to the other end of the light pipe 34 at the second earpiece 26.

Continuing to refer to FIG. 4, the modulated light output from the tether 34 is received by a photodetector 72 included in the second earpiece 26. The photodetector 72 converts the modulated light into an electrical audio signal that is input to an audio amplifier 74 also included in the second earpiece 26. The amplified audio signal is then input to the electro-acoustical transducer 76 of the second earpiece 26 so as to reproduce the audio sound.

The light pipe making up the tether 34 preferably is a small flexible tube with a reflective coating or cladding so that sufficient optical energy is available to drive the second earpiece 26. The optical energy may be in the visible (e.g., white light) or non-visible (e.g., IR) wavelengths without departing from the scope of the invention. The tether 34 is preferably a flexible tube light pipe rather than a conventional optical fiber for the reason that optical fibers are typically more brittle. This makes it difficult for the optical fiber to be retracted easily onto the spool 40 (FIG. 2) without breaking. Nevertheless, the present invention also contemplates utilizing an optical fiber within the intended scope of the present invention.

As is also shown in FIG. 4, the second earpiece 26 includes a small battery 78 for providing the necessary operating power to any electronics within the second earpiece 26. The battery may be replaceable or rechargeable, as is discussed more fully below.

Figure 5:
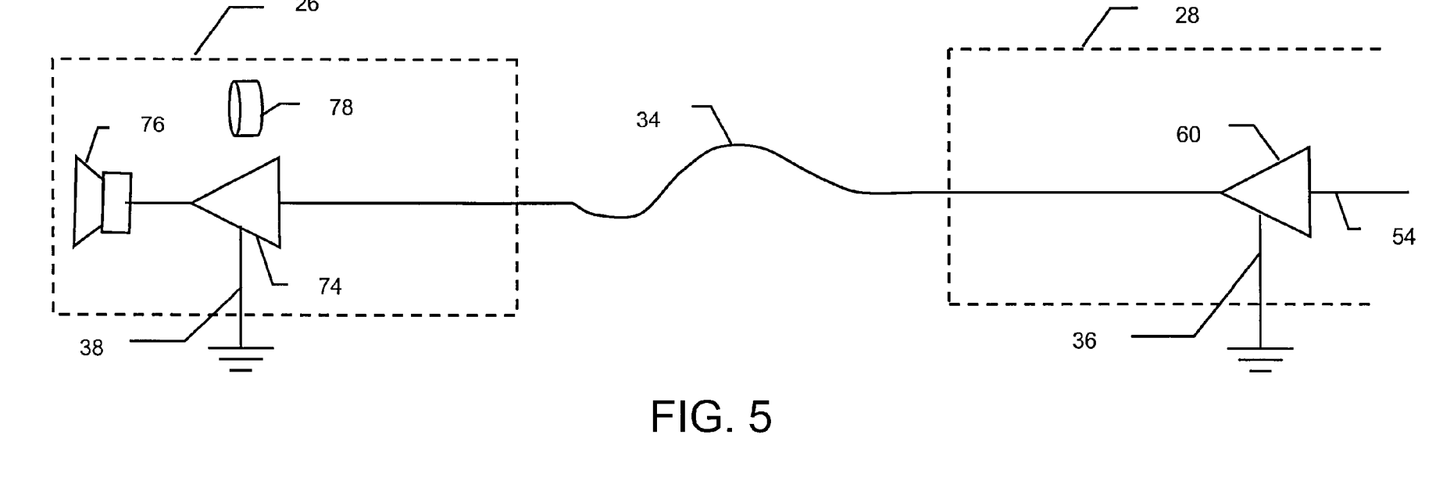
FIG. 5 is a block diagram of a handsfree accessory, again shown in relevant part, in accordance with yet another particular embodiment of the present invention.

FIG. 5 illustrates another embodiment of the tether 34. In this embodiment, the tether 34 comprises only a single electrically conductive wire. One end of the wire is connected to the output of the audio amplifier 60 in the earpiece housing 28, and the other end is connected to the input of the amplifier 74 in the second earpiece 26. The electrodes 36 and 38 engage in physical contact with the skin of the user when the respective earpieces are inserted in the ear, and are configured so as to establish a common virtual ground between the audio signal as output by the earpiece housing 28 and the second earpiece 26. Thus, the second channel audio information travels to the second earpiece 26 via the single wire tether 34 and returns to "ground" via the skin of the user.

Those having ordinary skill will appreciate that the electrodes 36 and 38 as shown in the exemplary embodiment are in the form of "button" type electrodes. It will be apparent, however, that other types of electrodes for contacting the body are possible without departing from the scope of the invention. For example, the electrodes 36 and 38 could instead be "ring shaped" electrodes. These ring shaped electrodes can provide contact with the user's skin all around the circumference of the inner ear of the user as will be appreciated.

Figure 6:
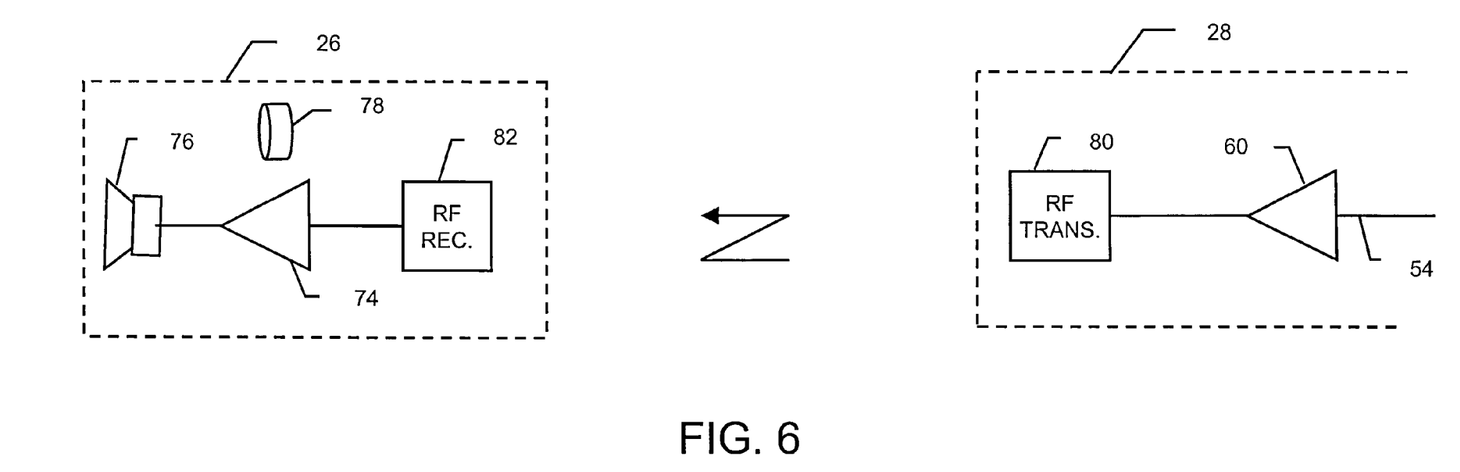
FIG. 6 is a block diagram of a handsfree accessory, shown in relevant part, in accordance with still another particular embodiment of the present invention.

FIG. 6 represents an embodiment of the present invention that utilizes a wireless link for providing the second channel audio information from the earpiece housing 28 to the second earpiece 26. In one particular example, the earpiece housing 28 includes a low power RF transmitter 80 that transmits the audio information to the second earpiece 26 via RF signal. More specifically, the RF transmitter 80 mixes the output of the amplifier 60 onto a low power RF carrier signal and transmits the signal to the second earpiece 26. The second earpiece 26 includes an RF receiver 82 that receives the signal and retrieves the audio information which is then amplified by the amplifier 74 and reproduced.

The RF transmitter 80 may be a circuit different from the wireless transceiver 46. Alternatively, the RF transmitter 80 may be comprised within the wireless transceiver 46 itself.

In another embodiment, the RF transmitter 80 and RF receiver 82 may be replaced with an optical transmitter and receiver, respectively. In such case, care must be taken to maintain line of sight communication between the transmitter and receiver.

Figure 7:
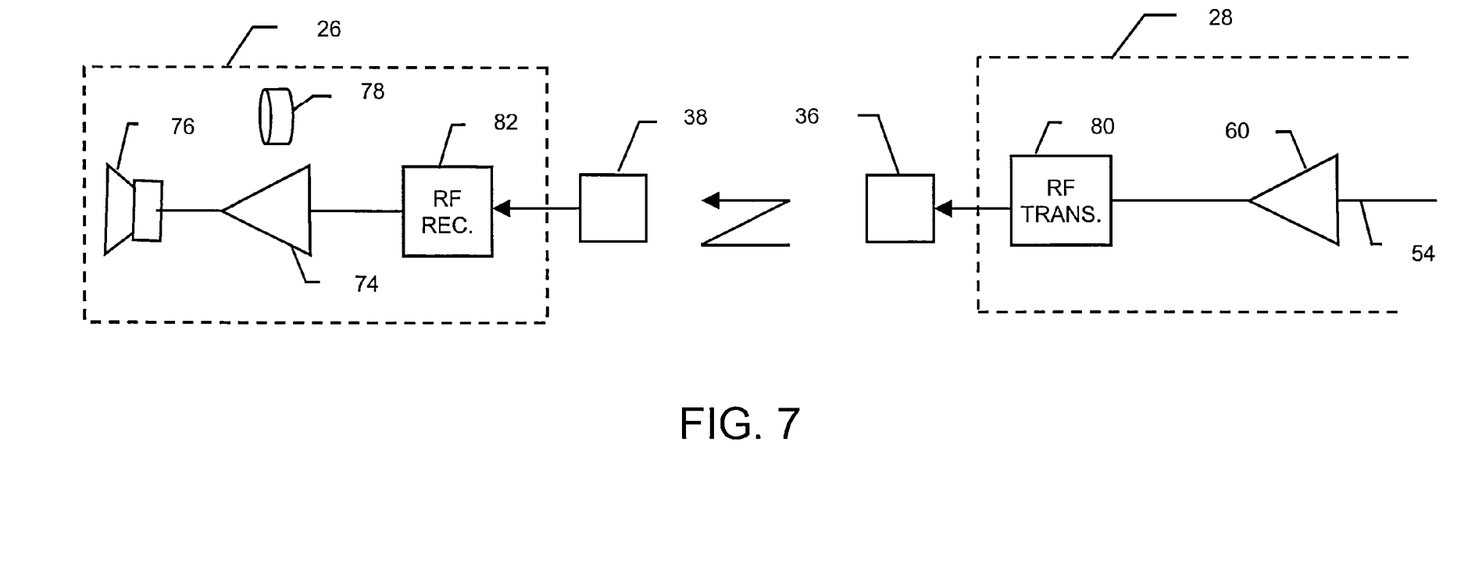
FIG. 7 is a block diagram of a handsfree accessory, shown in relevant part, in accordance with yet another particular embodiment of the present invention.

In still another embodiment as represented in FIG. 7, the electrodes 36 and 38 serve to couple the output and input of the RF transmitter 80 and RF receiver 82, respectively, to the skin of the user. This embodiment uses known near-field RF (also referred to as Personal Area Network) techniques to send the second channel audio information as micro-power RF energy conducted through the body of the user. Such approach is particularly secure since the micropower RF does not escape the vicinity of the body of the user.

Figure 8:
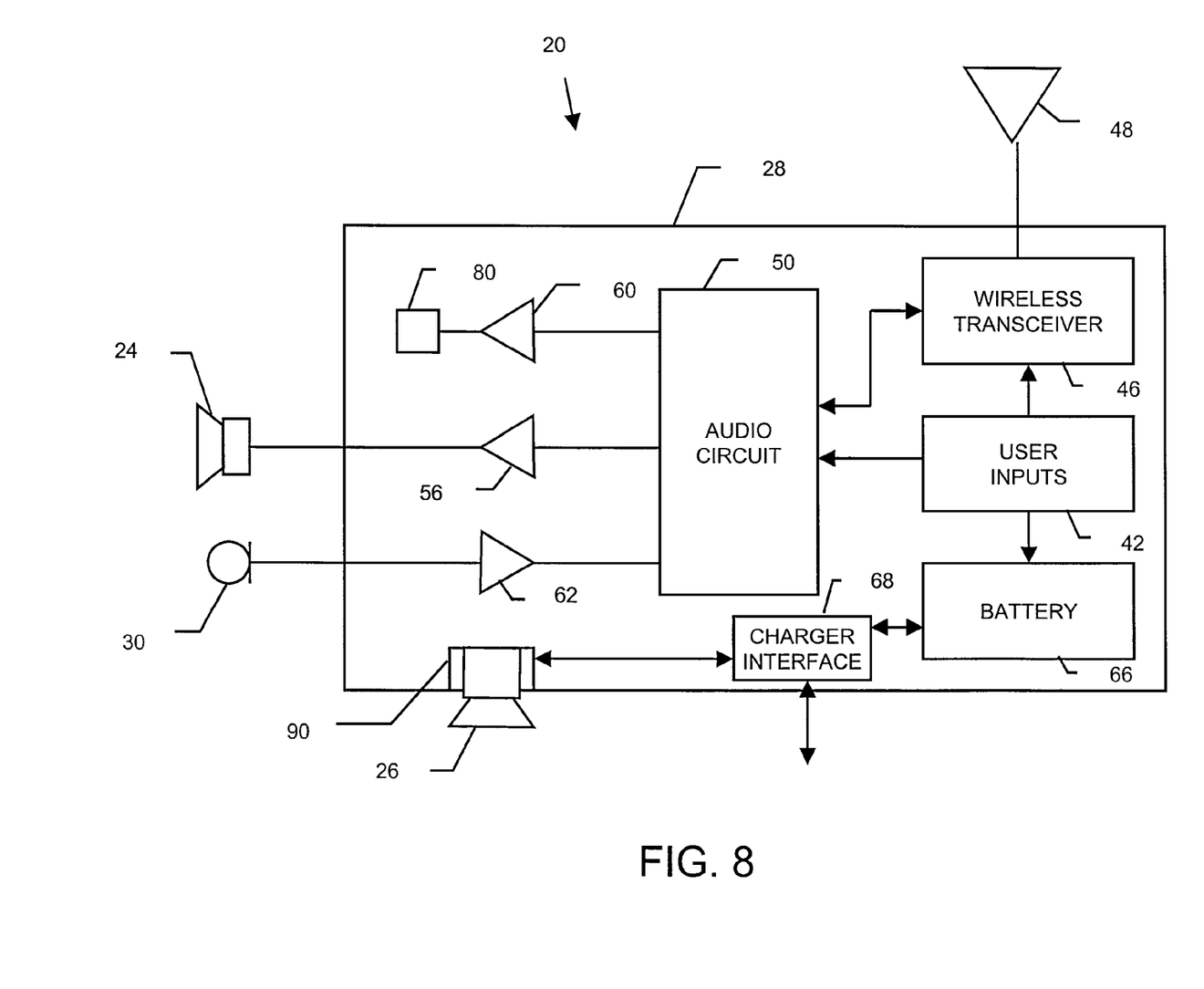
FIG. 8 is a simplified block diagram of a handsfree accessory in accordance with another embodiment of the present invention.

FIG. 8 illustrates an embodiment of the present invention that enables quick and easy recharging of the battery 78 in those embodiments of the second earpiece 26 having a battery 78. The earpiece housing comprises a connector 90 for electrically engaging electrical contacts in the second earpiece 26. This enables the battery 78 in the second earpiece 26 to be recharged when a battery 66 in the earpiece housing 28 is recharged. Specifically, the connector 90 preferably is designed to accept insertion of the second earpiece so as to engage electrical contacts on the second earpiece 26. The electrical contacts (not shown) are coupled to the battery terminals of the battery 78. The connector 90 connects the battery terminals to the charger interface 68 as shown so that the battery 78 may be charged when the battery 66 is charged.

In an embodiment in which the handsfree accessory 20 does not include a tether 34, the connector 90 preferably serves also as a mechanical connector for holding the second earpiece 26 together with the earpiece housing 28 when not in use. In an embodiment in which the handsfree accessory 20 includes a retractable tether 34, preferably the connector 90 is configured such that when the tether 34 is fully retracted the second earpiece 26 becomes engaged within the connector 90 so as to be recharged together with the battery in the earpiece housing 28.

Those having ordinary skill will therefore appreciate that the present invention provides a wireless handsfree accessory for a mobile phone or other electronic equipment without sacrificing stereo or multi-channel audio operation.

Although the invention has been shown and described with respect to certain preferred embodiments, it is obvious that equivalents and modifications will occur to others skilled in the art upon the reading and understanding of the specification. For example, although the present invention has been described herein primarily in the context of a handsfree accessory for a mobile phone, the present invention has utility with other types of electronic equipment as well. The present invention includes all such equivalents and modifications, and is limited only by the scope of the following claims.

The terms "electronic equipment" and "electronic devices" as referred to herein include portable radio communication equipment. The term "portable radio communication equipment", also referred to herein as a "mobile radio terminal", includes all equipment such as mobile phones, pagers, communicators, e.g., electronic organizers, personal digital assistants (PDAs), smartphones or the like.

The invention claimed is:

1. A handsfree accessory for a mobile communication device, comprising:
    first and second earpieces each having a respective audio transducer;

a microphone; and a transceiver, operatively coupled to the respective audio transducers and the microphone, for providing wireless communication between the handsfree accessory and the mobile communication device;

an electrically conductive wire which carries audio information between the transceiver and the audio transducer of the second earpiece; and at least one electrical body contact for establishing a virtual ground via the body of a user with respect to the audio information carried on the electrically conductive wire.

2. The handsfree accessory of claim 1, further comprising an earpiece housing integral with the first earpiece and housing the transceiver.

3. The handsfree accessory of claim 2, wherein the second earpiece is coupled to the housing via a tether.

4. The handsfree accessory of claim 3, wherein the tether is retractable.

5. The handsfree accessory of claim 3, wherein the tether comprises the electrically conductive wire which carries audio information between the transceiver and the audio transducer of the second earpiece.

6. The handsfree accessory of claim 5, wherein the tether comprises a pair of electrically conductive wires which carry the audio information between the transceiver and the audio transducer of the second earpiece.

7. The handsfree accessory of claim 3, wherein the tether comprises a light guide which carries audio information between the transceiver and the audio transducer of the second earpiece.

8. The handsfree accessory of claim 3, wherein the tether comprises an optical fiber which carries audio information between the transceiver and the audio transducer of the second earpiece.

9. The handsfree accessory of claim 2, further comprising a wireless link for carrying audio information between the transceiver and the audio transducer of the second earpiece.

10. A handsfree accessory for a device, comprising:

first and second earpieces each having a respective audio transducer;

a receiver, operatively coupled to the respective audio transducers, for providing wireless communication between the handsfree accessory and the device;

an earpiece housing integral with the first earpiece and housing the receiver; and a non-two-wire communication link which carries audio information between the receiver and the audio transducer of the second earpiece;

wherein the non-two-wire communication link comprises an electrically conductive wire which carries audio information between the transceiver and the audio transducer of the second earpiece, and at least one electrical body contact for establishing a virtual ground via the body of a user with respect to the audio information carried on the electrically conductive wire.

11. The handsfree accessory of claim 10, wherein the non-two-wire communication link comprises a light guide which carries audio information between the transceiver and the audio transducer of the second earpiece.

12. The handsfree accessory of claim 10, wherein the non-two-wire communication link comprises an optical fiber which carries audio information between the transceiver and the audio transducer of the second earpiece.

13. The handsfree accessory of claim 10, wherein the non-two-wire communication link comprises a wireless link for carrying audio information between the transceiver and the audio transducer of the second earpiece.

14. The handsfree accessory of claim 13, wherein the wireless link comprises a radio frequency (RF) link.

15. The handsfree accessory of claim 14, wherein the RF link comprises a near-field RF link.

16. The handsfree accessory of claim 15, wherein the near-field RF link utilizes body conduction of a user.

17. The handsfree accessory of claim 13, wherein the wireless link comprises an optical link.

18. The handsfree accessory of claim 13, wherein the wireless link comprises an IR link.

19. The handsfree accessory of claim 10, wherein the earpiece housing comprises an electrical connector for electrically engaging the second earpiece to enable a battery in the second earpiece to be recharged when a battery in the earpiece housing is recharged.

* * * * *